June 19, 1923.

H. W. MUHLEISEN

BRAKE

Filed Jan. 30, 1922

INVENTOR:
HENRY W. MUHLEISEN,
BY
Graham + Harris
ATTORNEYS.

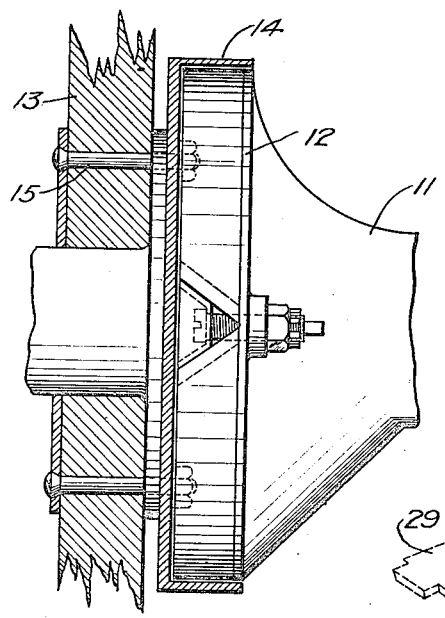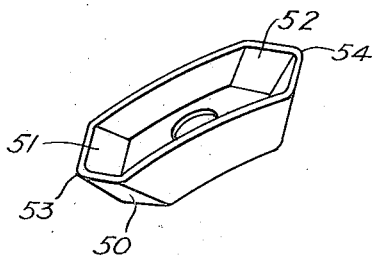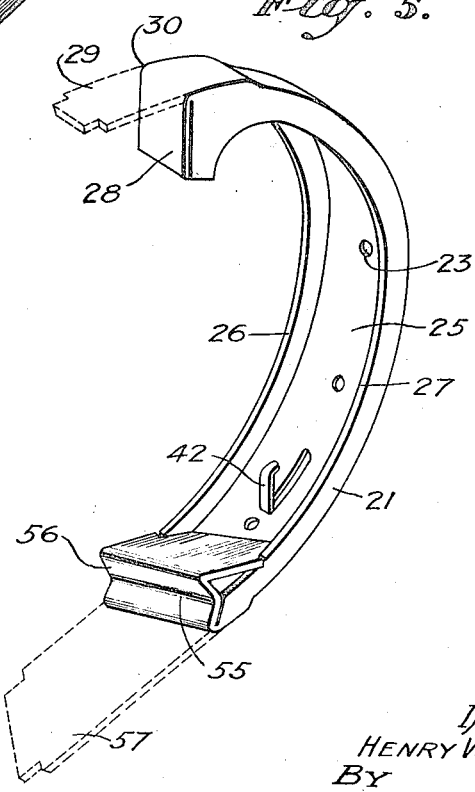

Patented June 19, 1923.

1,459,237

UNITED STATES PATENT OFFICE.

HENRY W. MUHLEISEN, OF LOS ANGELES, CALIFORNIA, ASSIGNOR TO W. S. RUSH & CO., OF LOS ANGELES, CALIFORNIA, A PARTNERSHIP COMPOSED OF W. S. RUSH, E. S. RUSH, AND B. C. GRAVES.

BRAKE.

Application filed January 30, 1922. Serial No. 532,851.

*To all whom it may concern:*

Be it known that I, HENRY W. MUHLEISEN, a citizen of the United States, residing at Los Angeles, in the county of Los Angeles and State of California, have invented a new and useful Improvement in Brakes, of which the following is a specification.

My invention relates to brakes and more particularly to internal expanding brakes, which are commonly used on the rear wheels of automobiles.

The principal object of my invention is to provide an internal brake which will be self-aligning and which will be extremely cheap to manufacture as well as extremely durable and positive.

A still further object of my invention is to provide a brake of this character which can be made wholly of sheet metal and which may be readily adjusted to compensate for wear without disassembling the automobile mechanism.

A still further object of my invention is to provide means integral with the brake for attaching resilient contractile means.

Further objects and advantages will be made evident hereinafter.

Referring to the drawing which is for illustrative purposes only,

Fig. 4 is a section through a brake drum on a plane represented by the line 4—4 of Fig. 2, the brake members and the expanding means being shown in elevation.

Fig. 5 is a perspective view of one of the brake members, the dotted lines indicating the sheet metal from which the brake member is constructed before same is finally bent to form the cam and wedge surfaces.

Fig. 6 is a perspective view of the wedge.

Figure 2:
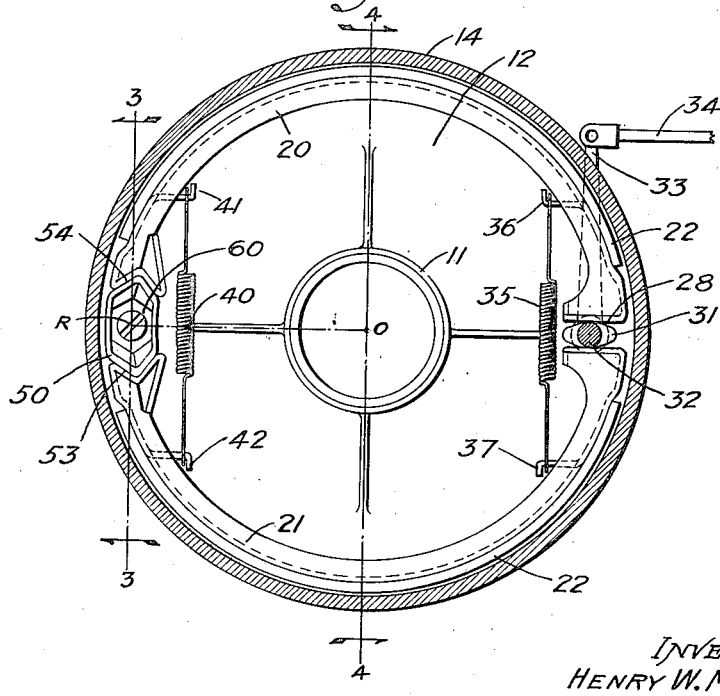
Fig. 2 is a section on a plane represented by the line 2—2 of Fig. 1.

In these drawings, 10 is the chassis of an automobile having rear axles 11 each of which terminates in a flat plate 12. Secured to axles turning in suitable bearings are rear wheels 13, each of which carries a brake drum 14 which is secured thereto by means of bolts 15. Situated inside the brake drum 14 are brake members 20 and 21, each of which carries on its outer surface a friction strap 22 which may be formed of leather, canvas, asbestos, fabric or the like and which may be secured to the cylindrical surface of the outer surface of the members 20 and 21 by suitable rivets, not shown, which pass through holes 23 in the members 20 and 21. In the cheaper forms of brake I omit the member 22 allowing the metal of the members 20 and 21 to bear directly on the inner surface of the brake drum 14. The members 20 and 21 are formed of sheet metal and are similar in form, one of them, however, being left handed with relation to the other, the two members being so formed that they may be placed inside the brake drum 14 as shown in Fig. 2. Each of the members 20 and 21 is of substantially channel shaped cross section consisting of an outer cylindrical portion 25 with inwardly projecting flanges 26 and 27. One end of each of the members 20 and 21 is provided with a cam surface 28, this cam surface being formed by turning an end 29, shown in dotted lines in Fig. 5, back substantially at right angles to a tangential plane extending from the corner 30. The cam surface 28 is engaged by a cam 31 carried on a pin 32. The pin 32 extends through the plate 12 and carries a lever 33 which is turned by means of a brake rod 34. The turning of the cam 31 forces the cam surfaces 28 apart and tends to expand the brake. This tendency to expand is resisted by a spring 35 secured to hooks 36 and 37 which are punched from the cylindrical surfaces 25 of the members 20 and 21. A similar spring 40 is secured to hooks 41 and 42 similarly punched from the outer cylindrical surface 25 of the members 20 and 21.

There is a considerable tendency for the members 20 and 21 to wear with use and I provide means by which this wear may be compensated for, this wear compensating mechanism consisting of a wedge 50 shown in Fig. 6 and comprises a pan shaped piece of sheet metal having wedge shaped ends 51 and 52, these wedge shaped ends terminating in sharp apexes 53 and 54. The apexes 53 and 54 rest in grooves 55 formed by wedge surfaces 56 on the ends of the members 20 and 21. These wedge surfaces 56 are formed by turning back member 57 as shown in Fig. 5.

Figure 1:
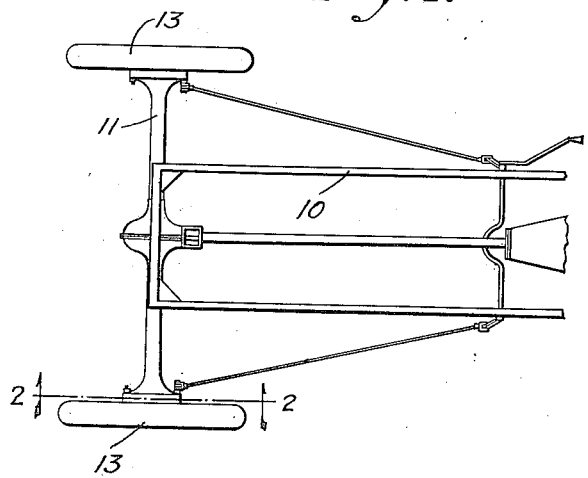
Fig. 1 is a plan view of a portion of an automobile equipped with my invention.
Figure 3:
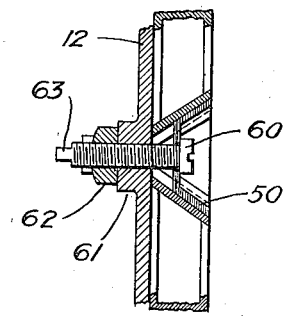
Fig. 3 is a section on a plane represented by the line 3—3 of Fig. 2.

Referring to Fig. 2 it will be noted that the line 3—3 is drawn at right angles to a radius r—o passing through a screw 60. The head of this screw 60 being better shown at Fig. 3 rests in the bottom of the wedge 50 and projects through a boss 61 in the plate 12 in which it is threaded and against which it is locked by means of a lock nut 62, the screw 60 having a square end 63 by means of which it may be turned.

It will be noted that the apexes 53 and 54 of the wedge 50 are located considerably inside of the line 3—3 as shown in Fig. 2. This construction, namely, with the apexes 53 and 54 in the position shown makes a self-centering brake which does not tend to grip excessively at any particular point. When it is desired to adjust the brake, the cam 31 is turned into a position to expand the cam ends 28 of the members 20 and 21. The lock nut 62 is loosened and the screw 60 is turned by means of the square end 63 until such a time as the wedge 50 expands the members 20 and 21 to produce an even contact between the members 22 and the interior of the drum. The lock nut is then tightened up holding the screw against turning. I attach particular importance to the fact that the members 20, 21 and 50 are formed entirely of sheet metal which may be of very high quality and which produces a structure which is very light, very strong and very cheap to manufacture.

I claim as my invention:

1. In a brake having a drum with an internal cylindrical surface, and an immediately adjacent stationary structure, the combination of: two brake members, each having an outer surface adapted to contact with said internal cylindrical surface of said drum, one end of each of said brake members being flattened to form a flat cam surface parallel to the axis of said drum, and the other end of each of said brake members being grooved to receive a wedge, said two members being respectively right and left handed so that when in place in the drum, the cam surface of one will lie adjacent to the cam surface of the other, the wedge surface of the one then lying adjacent to the wedge surface of the other; a working cam between said cam surfaces; a wedge between said wedge surfaces, said wedge having a central hole and two ends each of wedge shaped form, the apex of each of said wedges being inside a tangent at right angles to a radius of the brake which passes through the center of the cam and which passes through said hole; elastic means for holding said members against said cam and said wedge and away from said inner surface of said drum; and a bolt passing through said hole about which said wedge may pivot, said bolt being also adapted to move said wedge axially to force the wedge ends of said members apart to compensate for wear on the external surface of said members or the internal surface of said drum.

2. In a brake having a drum with an internal cylindrical surface, and an immediately adjacent stationary structure, the combination of: two brake members formed of sheet metal of substantially U shaped section and comprising an outer cylindrical surface and two inwardly projecting flanges, each having an outer surface adapted to contact with said internal cylindrical surface of said drum, one end of each of said brake members being flattened to form a flat cam surface parallel to the axis of said drum, and the other end of each of said brake members being grooved to receive a wedge, said two members being respectively right and left handed so that when in place in the drum, the cam surface of one will lie adjacent to the cam surface of the other, the wedge surface of the one then lying adjacent to the wedge surface of the other; a working cam between said cam surfaces; a wedge between said wedge surfaces, said wedge having a central hole and two ends each of wedge shaped form, the apex of each of said wedges being inside a tangent at right angles to a radius of the brake which passes through the center of the cam and which passes through said central hole; elastic means for holding said members against said cam and said wedge and away from said inner surface of said drum; and a bolt passing through said hole about which said wedge may pivot, said bolt being also adapted to move said wedge axially to force the wedge ends of said members apart to compensate for wear on the external surface of said members or the internal surface of said drum.

3. In a brake having a drum with an internal cylindrical surface, and an immediately adjacent stationary structure, the combination of: two brake members formed of sheet metal of substantially U shaped section and comprising an outer cylindrical surface and two inwardly projecting flanges, each having an outer surface adapted to contact with said internal cylindrical surface of said drum, one end of each of said brake members being flattened to form a flat cam surface parallel to the axis of said drum, and the other end of each of said brake members being grooved to receive a wedge, said two members being respectively right and left handed so that when in place in the drum, the cam surface of one will lie adjacent to the cam surface of the other, the wedge surface of the one then lying adjacent to the wedge surface of the other; a working cam between said cam surfaces; a wedge between said wedge surfaces, said wedge having a central hole and two ends each of wedge shaped form, the apex of each of said wedges being inside a tangent at right angles to a radius of the brake which passes through the center of the cam and which passes through said central hole; four hooks, two punched from the cylindrical outer surface of one of said brake members and two punched from the cylindrical outer surface of the other of said brake members, one of said hooks on each member being near the cam surface and the other of said hooks on each member being near the wedge surface, said hooks extending inwardly; a tension wedge spring fastened at one end to one of said hooks near the wedge end of one of said brake members, and at the other end to one of said hooks near the wedge end of the other of said brake members; a cam tension spring fastened at one end to one of said hooks near the cam end of one of said brake members, and at the other end to one of said hooks near the cam end of the other of said brake members; and a bolt passing through said hole about which said wedge may pivot, said bolt being also adapted to move said wedge axially to force the wedge ends of said members apart to compensate for wear on the external surface of said members or the internal surface of said drum.

In testimony whereof, I have hereunto set my hand at Los Angeles, California, this 24th day of January, 1922.

HENRY W. MUHLEISEN.